(12) United States Patent
Torrabias Cantal

(10) Patent No.: US 10,669,763 B2
(45) Date of Patent: Jun. 2, 2020

(54) COMPACT CLAMP FOR SLIDING GLASS DOORS WITH INCORPORATED DAMPER

(71) Applicant: Oscar Torrabias Cantal, Sant Quirze de Besora (ES)

(72) Inventor: Oscar Torrabias Cantal, Sant Quirze de Besora (ES)

(*) Notice: Subject to any disclaimer, the term of this patent is extended or adjusted under 35 U.S.C. 154(b) by 0 days.

(21) Appl. No.: 16/301,593

(22) PCT Filed: Jun. 15, 2017

(86) PCT No.: PCT/ES2017/070440
§ 371 (c)(1),
(2) Date: Nov. 14, 2018

(87) PCT Pub. No.: WO2017/220833
PCT Pub. Date: Dec. 28, 2017

(65) Prior Publication Data
US 2019/0119967 A1    Apr. 25, 2019

(30) Foreign Application Priority Data
Jun. 23, 2016  (ES) .................................. P201630852

(51) Int. Cl.
*E05F 5/00* (2017.01)
*F16F 9/06* (2006.01)
(Continued)

(52) U.S. Cl.
CPC ............ *E05F 5/003* (2013.01); *F16F 9/0218* (2013.01); *F16F 9/06* (2013.01); *F16F 9/061* (2013.01);
(Continued)

(58) Field of Classification Search
CPC .. E05F 5/003; F16F 9/0218; F16F 9/06; F16F 9/516
See application file for complete search history.

(56) References Cited

U.S. PATENT DOCUMENTS 8,931,138 B2 * 1/2015 Shimizu .................... E05F 1/16
                                                             16/49
9,500,016 B2  11/2016 Wang et al.
(Continued)

FOREIGN PATENT DOCUMENTS

CN    201359049 Y    12/2009
ES    0 196 927 U    4/1975
(Continued)

OTHER PUBLICATIONS

International Search Report, dated Jul. 12, 2017, from corresponding PCT/ES2017/070440 application.

*Primary Examiner* — Jeffrey O'Brien
(74) *Attorney, Agent, or Firm* — Defillo & Associates, Inc.; Evelyn A Defillo

(57) ABSTRACT

Disclosed is a new compact clamp for sliding glass doors, which includes two jaws, left jaw and right jaw. One of the jaws has a damper formed by a double-effect damper with gas and oil technology, using a cylinder containing a front gas chamber and a rear gas chamber which are located at the ends of the cylinder, and a central oil tank, the gas chambers and the oil tank being separated by a blind piston and an annular piston, which are both leak tight. In the central oil tank is disposed a non-leak tight damping piston that is connected to a rod of the damper and divides the tank into two oil chambers.

17 Claims, 3 Drawing Sheets

(51) Int. Cl.
  *F16F 9/02* (2006.01)
  *F16F 9/58* (2006.01)
  *F16F 9/516* (2006.01)
  *E05D 15/06* (2006.01)

(52) U.S. Cl.
  CPC ............. *F16F 9/58* (2013.01); *E05D 15/063* (2013.01); *E05Y 2201/264* (2013.01); *E05Y 2201/412* (2013.01); *E05Y 2201/424* (2013.01); *E05Y 2201/478* (2013.01); *E05Y 2201/686* (2013.01); *E05Y 2800/00* (2013.01); *E05Y 2800/20* (2013.01); *E05Y 2800/672* (2013.01); *E05Y 2900/132* (2013.01); *F16F 9/516* (2013.01); *F16F 2228/08* (2013.01); *F16F 2232/08* (2013.01)

(56) References Cited

U.S. PATENT DOCUMENTS

| | | | | |
|---|---|---|---|---|
| 2009/0121596 | A1* | 5/2009 | Ferrari | E05F 5/003 312/334.8 |
| 2013/0333292 | A1* | 12/2013 | Beyerle | E05F 5/003 49/414 |
| 2014/0026358 | A1* | 1/2014 | Saito | E05F 5/003 16/72 |
| 2016/0369548 | A1* | 12/2016 | Dodge | E05F 5/003 |
| 2017/0260793 | A1* | 9/2017 | Munoz Pelayo | E05F 5/003 |
| 2018/0371815 | A1* | 12/2018 | Intelmann | E05F 3/02 |

FOREIGN PATENT DOCUMENTS

| | | |
|---|---|---|
| ES | 2 302 263 T3 | 7/2008 |
| ES | 1 0722 38 U | 6/2010 |
| ES | 1072238 U | 6/2010 |
| ES | 1075196 U | 8/2011 |
| ES | 2386103T T3 | 8/2012 |
| ES | 1135460 U | 1/2015 |
| ES | 2572158 A1 | 5/2016 |
| ES | 2592525 A1 | 11/2016 |
| GB | 1194140 A | 6/1970 |
| GB | 1 316 551 A | 5/1973 |
| GB | 1592518 A | 7/1981 |
| GB | 2132313 A | 7/1984 |
| TW | M493587 U | 1/2015 |
| WO | 2012113612 A1 | 8/2012 |

* cited by examiner

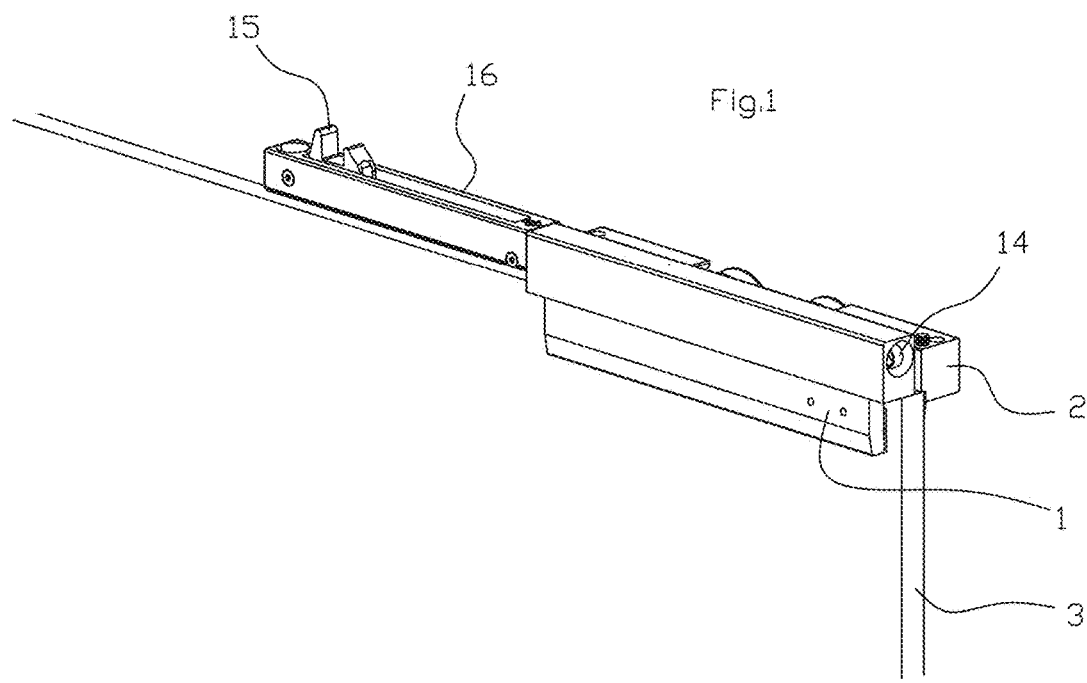
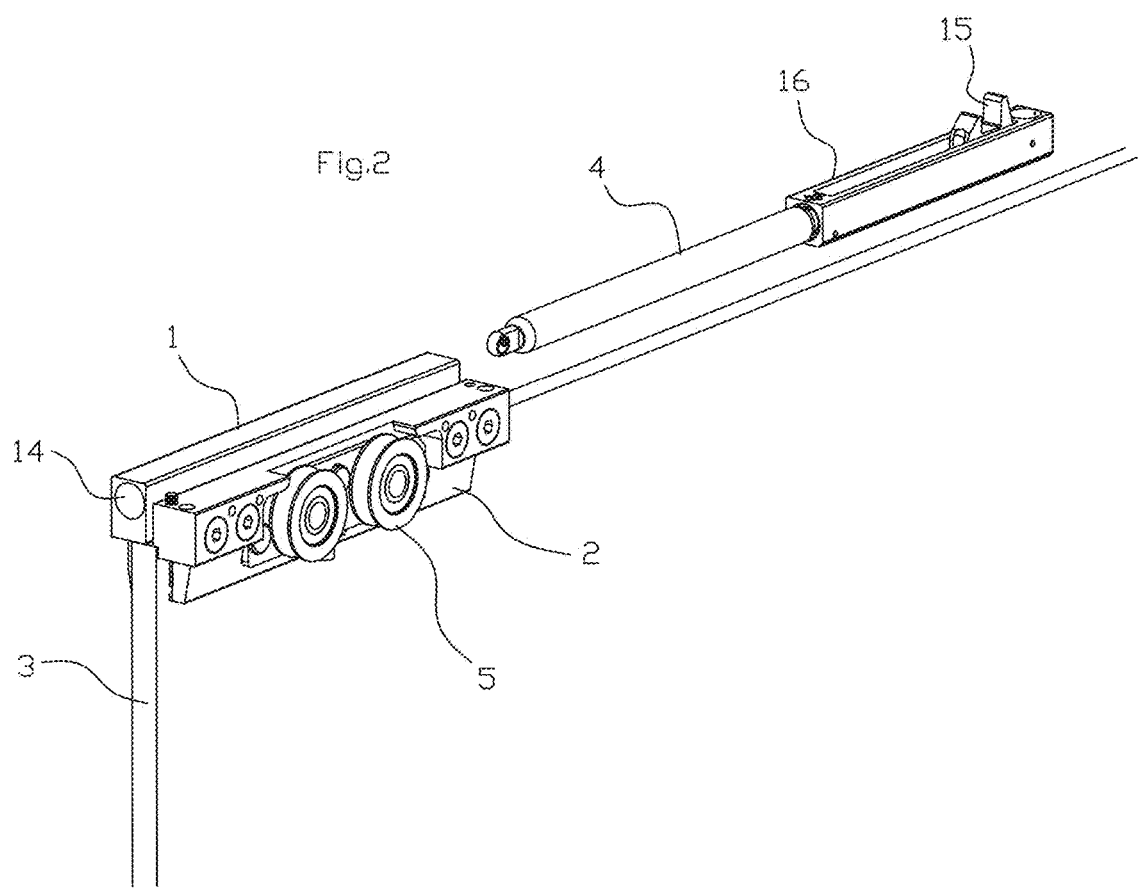

COMPACT CLAMP FOR SLIDING GLASS DOORS WITH INCORPORATED DAMPER

TECHNICAL SECTOR

The invention refers to a clamp for glass doors which incorporates means to cushion the inertia of the door during its closing or opening, preventing it from striking the frame and controlling a drive of the door to an end-of-stroke position, preventing the door from being in an intermediate position if the force provided by the user has been insufficient. The particularity of this invention lies in its extremely compact configuration that allows the placement of a double brake system, one for opening and another for closing, in doors of reduced width.

STATE OF ART

There are known devices to stop the sliding doors in the end of stroke section, whose purpose is to dissipate the inertia of the door and accompany it at the end of its travel, preventing it from hitting when the closure is violent or, on the contrary, it stays ajar when not enough momentum has been given.

The damping means of the known devices are constituted by the combination of a spring and a pneumatic piston which act together to achieve the desired effect.

On the one hand, the pneumatic piston decreases the linear speed of the door as it is compressed, while the force of recovery of the spring when released, drags the door to its position at the end of stroke.

Examples of this type of device are described in the inventions ES0196927U, ES2302263U, ES1072238U and ES2572158A1.

For glass doors, have been designed specifics devices, such as those described in the inventions TW493587U and ES1075196U, in which the damping element is associated with a carriage from which a clamp hangs by means of which the glass is clamped. This carriage runs along a rolling guide in which drive elements of the piston-spring assembly are incorporated.

A more developed device and which constitutes the closest known state of the technique is the invention ES1135460U, where a device for sliding glass doors is described in which the clamping clamp of the glass incorporates means for brake and accompany the door to its end-of-stroke position, consisting of a protruding plunger on one side of the clamp, which is operatively hidden inside, overcoming the resistance of a spring or compressing a gas and a conventional end-of-stroke damper.

The plunger is oriented in the direction of advance of the door and has the purpose of braking it when the end of its shank contacts an end-of-stroke limit.

The end-of-stroke damper consists of a pneumatic piston and a spring that are associated with the gripper on the opposite side to the side on which is projected the shank of plunger.

This device positively fulfills the function of deceleration and accompaniment of the glass door until its end-of-stroke position, but requires a large installation space, resulting from the sum of the body of the clamp, plus the section of shank of plunger projected out the clamp, plus the extent of the extended damper, making it impossible to mount a double damper for opening and closing on small doors.

Another problem of this type of devices is the rebound effect that occurs in the deceleration of the door, this being a non-homogeneous or linear deceleration.

DESCRIPTION OF THE INVENTION

The object of the present invention is a compact clamp for glass sliding doors with an end-of-stroke damper, where the glass clamp comprises two clamps that are connected by means of connecting screws and spacer screws, that allow separation suitable for coupling to glass doors of different thicknesses.

One jaw incorporates a double effect damper and gas and oil technology, while the other incorporates one or more wheels for the movement of the door by an aerial rail.

The double effect damper and gas and oil technology is of the type that involves a cylinder in which two gas chambers are distinguished, preferably nitrogen gas, located at the ends of the cylinder and a central oil tank, separating the gas chambers and the central oil tank by two watertight floating pistons.

A third non-watertight piston is arranged in the central oil tank which is connected to the shank of the shock absorber and which divides it into two chambers allowing the transfer of oil between them.

This type of damper combines the functions of two gas pistons and one oil damper in a single component, thus providing two effects: the harmonic deceleration of a large weight and the soft movement of a mass in linear motion to reach a final preset position. This deceleration occurs without the annoying rebound effect of conventional damping means based on a pneumatic piston and a spring.

The double-effect damper with gas and oil technology are integrated in the jaw or it is constituted as an independent element to it, but it is housed in jaw, specifically, in a space provided for the coupling of the damper cylinder.

The shank of the damper has on its external end an oscillating hook that runs through a guide provided in the body of the clamp or coupled to it.

This hook is of conventional type and is designed to be coupled to an end-of-stroke limit located strategically in the guide through which the door runs or in its frame, involving means to block the position of the damper in prestressed situation.

The size of the present invention is less than that of any other known equivalent element; basically, the wingspan of the body of the clamp plus the section of protruding shank, avoiding the space normally occupied by the piston gas and spring assembly, common to any other device dedicated to the same purpose. This containment allows the assembly of two damping devices, one to retain the door in the closure and another for the opening, in sliding doors of reduced width, where any other device would be impossible to assemble since the sum of its wingspans is greater than the width of the door.

DESCRIPTION OF THE DRAWINGS

To illustrate what has hitherto been explained, the present description is accompanied by a set of drawings that are only illustrative and not limiting of the practical possibilities of the invention.

In said drawings:

FIG. 1 corresponds to a perspective view of a new compact clamp coupled to the glass pane of a sliding door.

FIG. 2 corresponds to a perspective view of a new compact clamp coupled to the glass pane of a sliding door, with the damper out of its housing.

LIST OF REFERENCES

Figure 3:
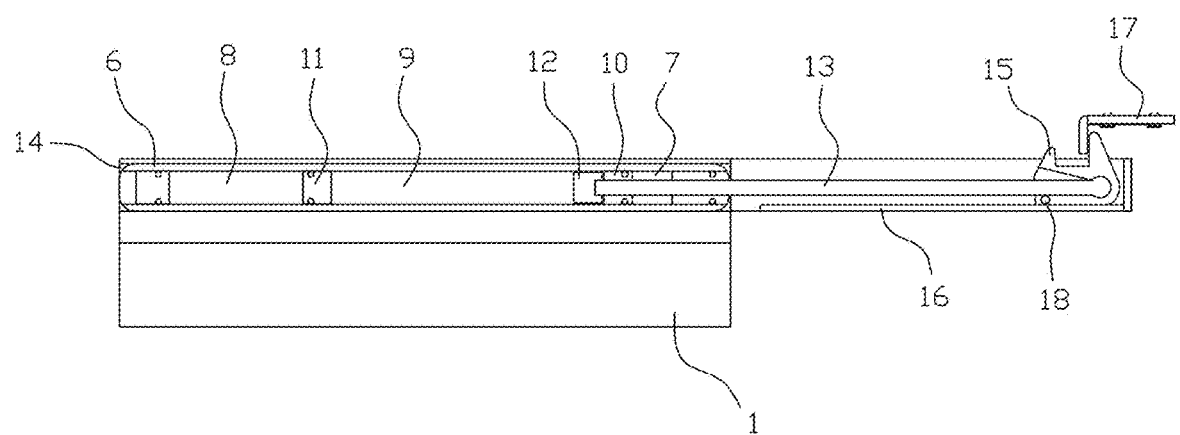
FIG. 3 corresponds to a sectional view of the new clamp with the extended damper.
Figure 4:
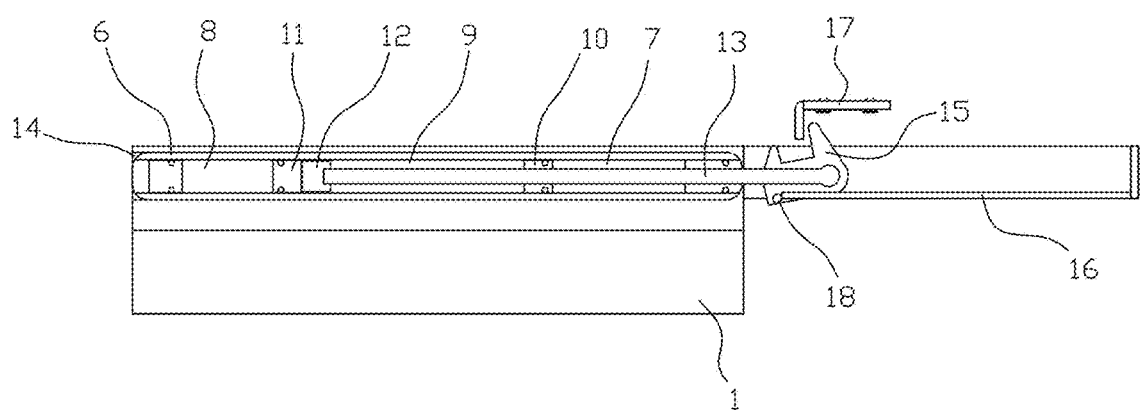
FIG. 4 corresponds to a sectional view of the new clamp with damper preloaded.
Figure 5:
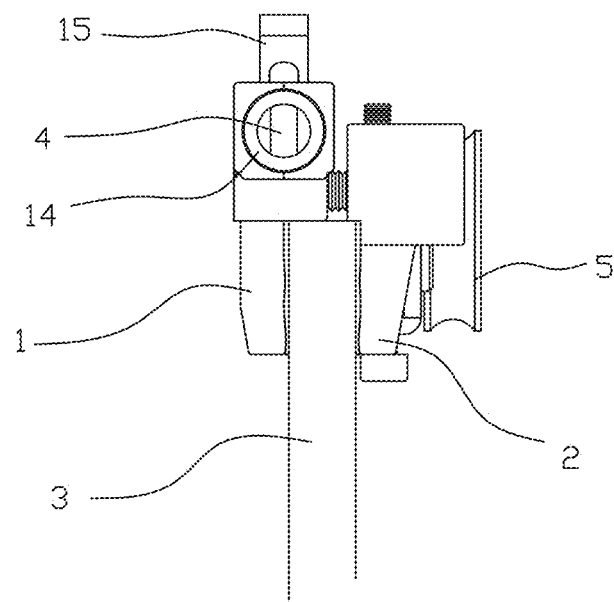
FIG. 5 corresponds to a side view of the new clamp.

1) Left jaw
2) Right jaw
3) Door
4) Damper
5) Wheels
6) Cylinder
7) Front gas chamber
8) Rear gas chamber
9) Central oil tank
10) Annular floating piston
11) Blind floating piston
12) Damper piston
13) shank
14) Cylindrical housing
15) Oscillating hook
16) Guide
17) End-of-stroke limit
18) Blocking means

DESCRIPTION OF A PRACTICAL EXAMPLE

According to the drawings, the new compact clamp has two jaws, left jaw (1) and right jaw (2), which are connected by means of connecting screws and spacer screws, that establish the adequate separation for their coupling to the glass door (3).

The left jaw (1) incorporates a double effect gas and oil damper, while the right jaw (2) incorporates two wheels (5) for the displacement of the door by an aerial rail not illustrated.

The damper (4), it has a space formed by a cylinder (6) which distinguishes a front gas chamber (7) and a rear gas chamber (8) located at the ends of the cylinder, the gas being nitrogen, and a central oil tank (9). The gas chambers (7 and 8) and the central oil tank (9) are separated by two watertight pistons, a blind floating piston (11) arranged between the rear gas chamber (8) and the central oil tank (9) and an annular floating piston (10) that is crossed by the shank (13) of the damper (4), arranged between the front gas chamber (7) and the central oil tank (9). Both pistons are watertight, so they are equipped with gaskets or sealing rings to avoid mixing gas and oil.

In the central oil tank (9) a third non-watertight damping piston (12) is available, which is connected to the damper shank (13) and which divides the central oil tank (9) into two chambers, in such a way that the movement of the piston forces a transfer of oil between chambers.

In the illustrative example, the double effect gas and oil damper (4) is constituted as an independent element of the left jaw (1), so that said left jaw (1) has a cylindrical housing (14) into which the cylinder (6) of the damper (4) is inserted.

The shank (13) of the damper (4) has an oscillating hook (15) at its outer end, that runs to a guide (16) coupled to the left jaw (1).

This oscillating hook (15) is coupled to an end-of-stroke limit (17) and comprises blocking means (18) constituted by a protusion integrated in the oscillating hook (15) which is snapped into a seat provided in the guide (16) fixing the position of the damper in prestressed position.

Figure 6:
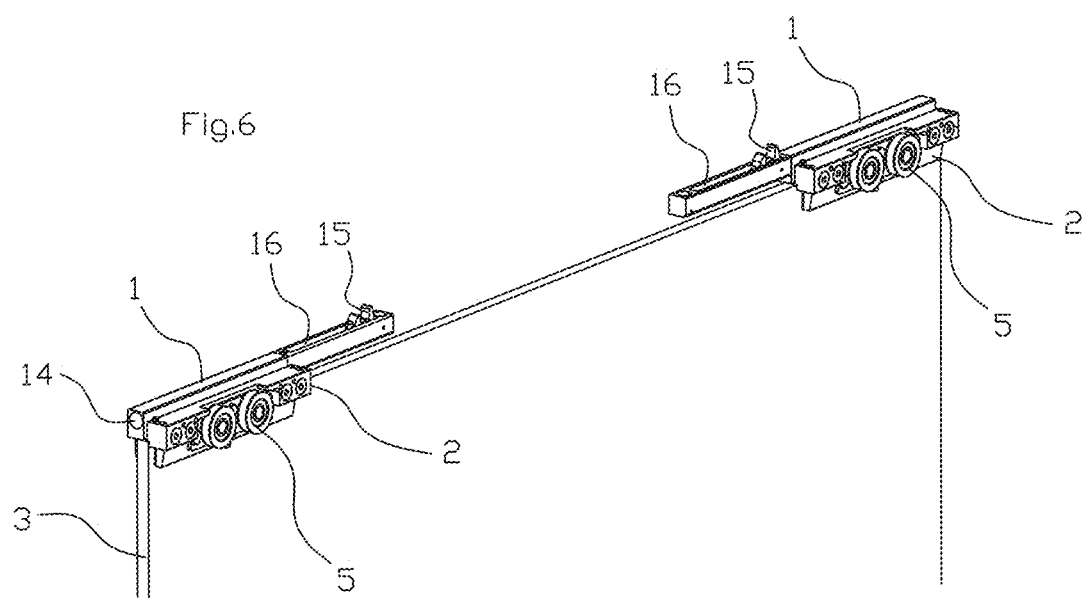
FIG. 6 corresponds to a perspective view of a door of small dimensions that mounts two compact clamps according to the invention, one to cushion and accompany the blade in the opening movement and another for the closing movement.

The new compact clamp eliminates the rebound effect during deceleration of the door. This deceleration is produced in a harmonic and linear throughout its duration and allows to implement damping for opening and closing in sliding doors of small widths, as shows in FIG. 6.

The invention claimed is:

1. A compact clamp for glass sliding doors, the clamp comprising:
    a right jaw and a left jaw that are connected by connecting screws and spacer screws to establish a separation to couple to glass doors of different thicknesses, one or more wheels being disposed in the right jaw to displace the door by an overhead rail, a double effect gas and oil damper being disposed in the left jaw, the damper including a shank and a cylinder having ends thereof, the cylinder including
    a front gas chamber and a rear gas chamber located at the ends of the cylinder
    a central oil tank located between the front gas chamber and the rear gas chamber,
    a blind floating piston that separates the rear gas chamber and the central oil tank,
    a watertight annular floating piston separating the front gas chamber and the central oil tank, the shank of the damper being configured to pass the floating piston, and
    a non-watertight damping piston connected to the shank and located in the central oil tank, dividing the central oil tank into two oil tank chambers.

2. The compact clamp for sliding glass doors according to claim 1, wherein the cylinder of the damper is inseparably integrated in the body of the left jaw.

3. The compact clamp for sliding glass doors according to claim 1, wherein the damper is independent of the jaws and is coupled in a cylindrical housing provided in the left jaw to receive the cylinder of the damper.

4. The compact clamp for sliding glass doors according claim 1, wherein the shank of the damper has an oscillating hook at an outer end thereof that runs through a guide provided in the body of the clamp or attached to the body of the clamp.

5. The compact clamp for sliding glass doors according claim 2, wherein the shank of the damper has an oscillating hook at an outer end thereof that runs through a guide provided in the body of the clamp or attached to the body of the clamp.

6. The compact clamp for sliding glass doors according claim 3, wherein the shank of the damper has an oscillating hook at an outer end thereof that runs through a guide provided in the body of the clamp or attached to the body of the clamp.

7. The compact clamp for sliding glass doors according to claim 4, wherein the oscillating hook is coupled to an end-of-stroke limit located in a guide through which the door runs or in a frame of the door, the oscillating hook comprising a blocker configured to block the position of the damper in a pre-stressed position.

8. The compact clamp for sliding glass doors according to claim 5, wherein the oscillating hook is coupled to an end-of-stroke limit located in a guide through which the door runs or in a frame of the door, the oscillating hook comprising a blocker configured to block the position of the damper in a pre-stressed position.

9. The compact clamp for sliding glass doors according to claim 6, wherein the oscillating hook is coupled to an end-of-stroke limit located in a guide through which the door runs or in a frame of the door, the oscillating hook comprising a blocker configured to block the position of the damper in a pre-stressed position.

10. The compact clamp for sliding glass doors according to claim 1, wherein the front and rear gas chambers contain nitrogen gas.

11. The compact clamp for sliding glass doors according to claim 2, wherein the front and rear gas chambers contain nitrogen gas.

12. The compact clamp for sliding glass doors according to claim 3, wherein the front and rear gas chambers contain nitrogen gas.

13. The compact clamp for sliding glass doors according to claim 4, wherein the front and rear gas chambers contain nitrogen gas.

14. The compact clamp for sliding glass doors according to claim 5, wherein the front and rear gas chambers contain nitrogen gas.

15. The compact clamp for sliding glass doors according to claim 6, wherein the front and rear gas chambers contain nitrogen gas.

16. The compact clamp for sliding glass doors according to claim 7, wherein the front and rear gas chambers contain nitrogen gas.

17. The compact clamp for sliding glass doors according to claim 8, wherein the front and rear gas chambers contain nitrogen gas.

* * * * *